D. CEDRONE.
DRILL.
APPLICATION FILED OCT. 25, 1913.

1,114,580.

Patented Oct. 20, 1914.

Witnesses

Inventor
Donato Cedrone.
By Mason Fenwick Lawrence
Attorneys

UNITED STATES PATENT OFFICE.

DONATO CEDRONE, OF NEW YORK, N. Y.

DRILL.

1,114,580.	Specification of Letters Patent.	Patented Oct. 20, 1914.

Application filed October 25, 1913. Serial No. 797,332.

*To all whom it may concern:*

Be it known that I, DONATO CEDRONE, a citizen of Italy, residing at New York, in the county of New York and State of New York, have invented certain new and useful Improvements in Drills; and I do hereby declare the following to be a full, clear, and exact description of the invention, such as will enable others skilled in the art to which it appertains to make and use the same.

This invention relates to drill bits and has for an object to provide an improved form of a bit to present a circular cutting action when the drill is being used.

Figure 1:
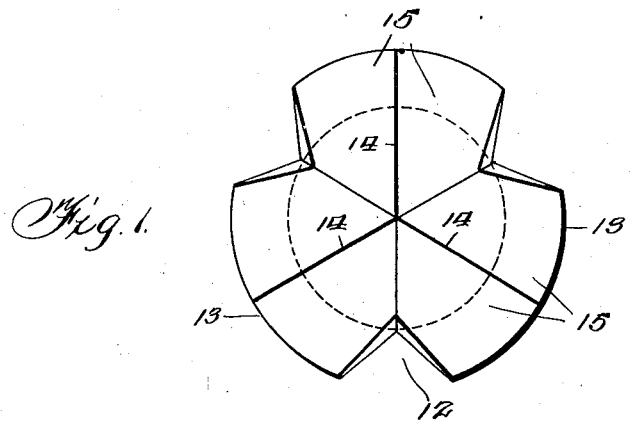
Figure 2:
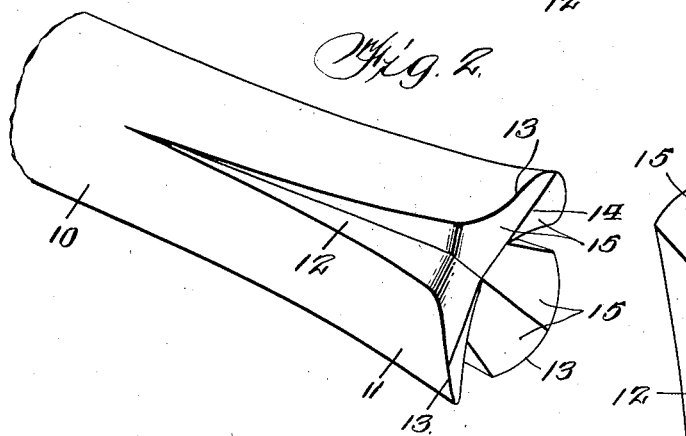
Figure 3:
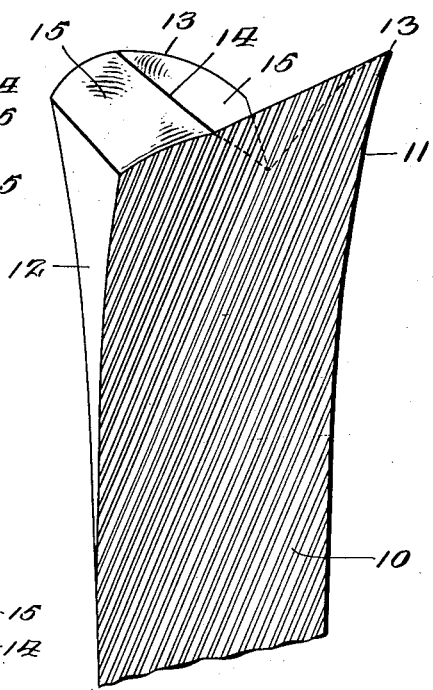

Further objects will be apparent from the following specification, appended claim and drawings in which:

Figure 1 is a plan view of one form of the bit. Fig. 2 is a perspective view thereof. Fig. 3 is a longitudinal sectional view and, Fig. 4 is a perspective view of a modified form.

Referring to the drawing in which similar reference numerals refer to similar parts throughout the several views, there is shown a shank 10 which has the cutting end thereof enlarged as at 11, and having V shaped grooves 12 formed in the sides of the enlarged portion. The V shaped grooves 12 form radially disposed claws which have the edges thereof sharpened as shown at 13. This cutting edge is substantially arcuate in side elevation and in end view. The end of each with these claws is formed of a rib 14 which stands radial to the end of the drill and is sharpened to the desired degree. This rib produces flaring faces 15 of which the portions between the cutting edges 13 and 14 are concaved as shown.

Figure 4:
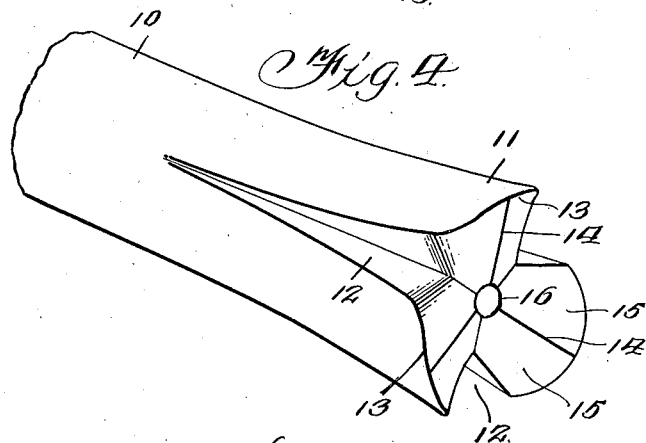

In the larger drills or those intended for machine driving, the drill is solid and the ridges formed by the cutting edges 14 meet at a common center, while the form shown in Fig. 4 has a central passage 16 through the shank and bit, to provide a conduit for water or air. The cutting edges are approximately in line with the line formed by the cutting edges of the sides 15 opposite thereto. The grooves 12 permit passage of the dust and chips formed in the cutting past the enlarged portion 11.

Having thus described my invention I claim:

The herein described bit comprising a shank enlarged toward its cutting end and provided with three V-shaped longitudinal grooves in its sides growing deeper toward said end and there producing interposed claws, the forward corner of each claw being struck on a single arc in both side elevation and end view and sharpened to a cutting edge, and the front end of each claw having a sharpened rib extending straight from the axis of the bit to said arc midway between two of said grooves with receding faces on opposite sides of the rib which flare from said axis and the bottom of one of said grooves outward to said arc, the shank having an axial passage opening through the point of juncture of said ribs.

In testimony whereof I affix my signature in presence of two witnesses.

DONATO CEDRONE.

Witnesses:
MAE PERRY,
GEORGE L. THORN.